(12) United States Patent
Celik (10) Patent No.: US 7,546,531 B2
(45) Date of Patent: Jun. 9, 2009

(54) ACCESSING ALTERNATE CONTENT

(75) Inventor: Tantek Celik, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 396 days.

(21) Appl. No.: 10/719,528

(22) Filed: Nov. 21, 2003

(65) Prior Publication Data

US 2005/0114761 A1    May 26, 2005

(51) Int. Cl.
*G06F 17/21* (2006.01)
*G06F 17/24* (2006.01)

(52) U.S. Cl. .................. 715/273; 715/200; 715/201; 715/204; 715/229; 715/271; 715/718; 715/727; 715/767

(58) Field of Classification Search .......... 715/500, 715/500.1, 511, 513, 718, 727, 767, 200, 715/201, 204, 229, 271, 273
See application file for complete search history.

(56) References Cited

U.S. PATENT DOCUMENTS

| 6,819,961 B2 * | 11/2004 | Jacobs et al. ............ 700/17 |
| 6,901,585 B2 * | 5/2005 | Dutta et al. ............. 717/143 |
| 6,959,326 B1 * | 10/2005 | Day et al. .............. 709/217 |
| 2002/0152283 A1 * | 10/2002 | Dutta et al. ............. 709/218 |
| 2004/0030928 A1 * | 2/2004 | Catudal et al. ........... 713/201 |

OTHER PUBLICATIONS

Microsoft Computer Dictionary, 2002, Microsoft Press, fifth edition, pp. 253 and 412.*

"define: focusable—Google Search, Definitions of Focusable on the Web:" 2007, Google.*
Microsoft Computer Dictionary, 2002, Microsft Corporation, Fifth Edition, p. 171.*
"OpenTV- The Complete ITV Solution", http://www.opentv.com/solutions/ , 2002 OpenTV, 2 pages.
"Enhanced TV", http://solutions.liberate.com/enhancedtv_solution.html, Liberate Technologies—Solutions, 2 pages.
"Moxi—Taking Digital Cable to a New Level", http://www.diego.com/prodserv/mediacenter.jsp, Diego—Products and Services—Moxi, 2 pages.
"The Message is the Message: Designing Information Technology for Inclusiveness and Accessibility", Davis et al., IEEE 2002, pp. 283-289.
"Development of Adaptive Web Sites with Usability and Accessibility Features", Marta Fernandez de Arriba et al., Springer-Verlag Berlin Heidelberg, 2002, pp. 501-504.
"Keeping Web Accessibility in Mind: I&R Services for All", Cyndi Rowland, Information and Referral, the Journal of the Alliance of Information and Referral Systems, vol. 23, 2001, pp. 160-187.

* cited by examiner

*Primary Examiner*—Joshua D Campbell
(74) *Attorney, Agent, or Firm*—Lee & Hayes, PLLC (57) ABSTRACT

A rendering engine that enables access to alternate content determines, based on an accessibility mode, a list of focusable elements associated with a document to be rendered. If the accessibility mode is inactive, the list of focusable elements includes elements that are, by default, focusable. If the accessibility mode is active, the list of focusable elements also includes elements that have associated alternate content, but that are not, by default, focusable. When an accessibility mode is active and an element with associated alternate content is selected, the alternate content is rendered.

27 Claims, 9 Drawing Sheets

ACCESSING ALTERNATE CONTENT

TECHNICAL FIELD

This invention relates to content accessibility and, in particular, to accessing alternate content.

BACKGROUND

Many interactive television systems allow television viewers to use their televisions to browse hypertext markup language (HTML) content, such as Internet websites. However, for some viewers, HTML content displayed on a television can be difficult to read, for example, due to poor eyesight. HTML includes functionality that allows an HTML developer to include alternate content associated with an HTML element. Examples of alternate content include text in a large font, or an audio description of an image. Some HTML browser applications written for use on computer systems include functionality for accessing alternate content, but typically rely on pointing devices, such as a mouse. Unfortunately, interactive television systems generally support user interaction through a television remote control and do not include a pointing device. As such, interactive television systems lack a mechanism for allowing viewers to access alternate content in HTML documents.

SUMMARY

Access to alternate content in documents rendered using an interactive television viewing system is described. A browser or other rendering engine that supports access to alternate content determines which elements in the document may receive focus, based on whether or not an accessibility mode is active. When an accessibility mode is active, the list of focusable elements may contain elements that, by default, are not focusable elements, but that have associated alternate content. An icon or other demarcation, either audio or visual, can be used to indicate to the user whether or not an accessibility mode is active. Furthermore, an input device, such as a television remote control can be configured to provide a mechanism for activating and deactivating an accessibility mode.

BRIEF DESCRIPTION OF THE DRAWINGS

The same numbers are used throughout the drawings to reference like features and components.

FIG. 1 illustrates an exemplary interactive television system in which access to alternate content may be implemented.

FIG. 2 illustrates select components of a client device implemented to support access to alternate content.

FIG. 3 illustrates an example display of HTML content with an accessibility mode inactivated.

FIG. 4 illustrates an example display of HTML content with an accessibility mode activated.

FIG. 5 illustrates an example display of alternate content associated with a text element.

FIG. 6 illustrates an example display of alternate content associated with an image element.

FIG. 7 illustrates rendering of alternate audio content associated with an image element.

FIG. 8 illustrates an exemplary method for providing access to alternate content.

FIG. 9 illustrates an exemplary method for rendering alternate content.

DETAILED DESCRIPTION

The following discussion is directed to accessing alternate content through an interactive television system. Access to alternate content as described herein may be implemented using a browser or other interface or rendering engine that renders documents (e.g., HTML or dynamic HTML) that may contain elements with associated alternate content. As described, the browser or other rendering engine provides a mechanism for accessing alternate content through an interactive television system using, for example, a television remote control.

Exemplary Interactive Television System

Figure 1:
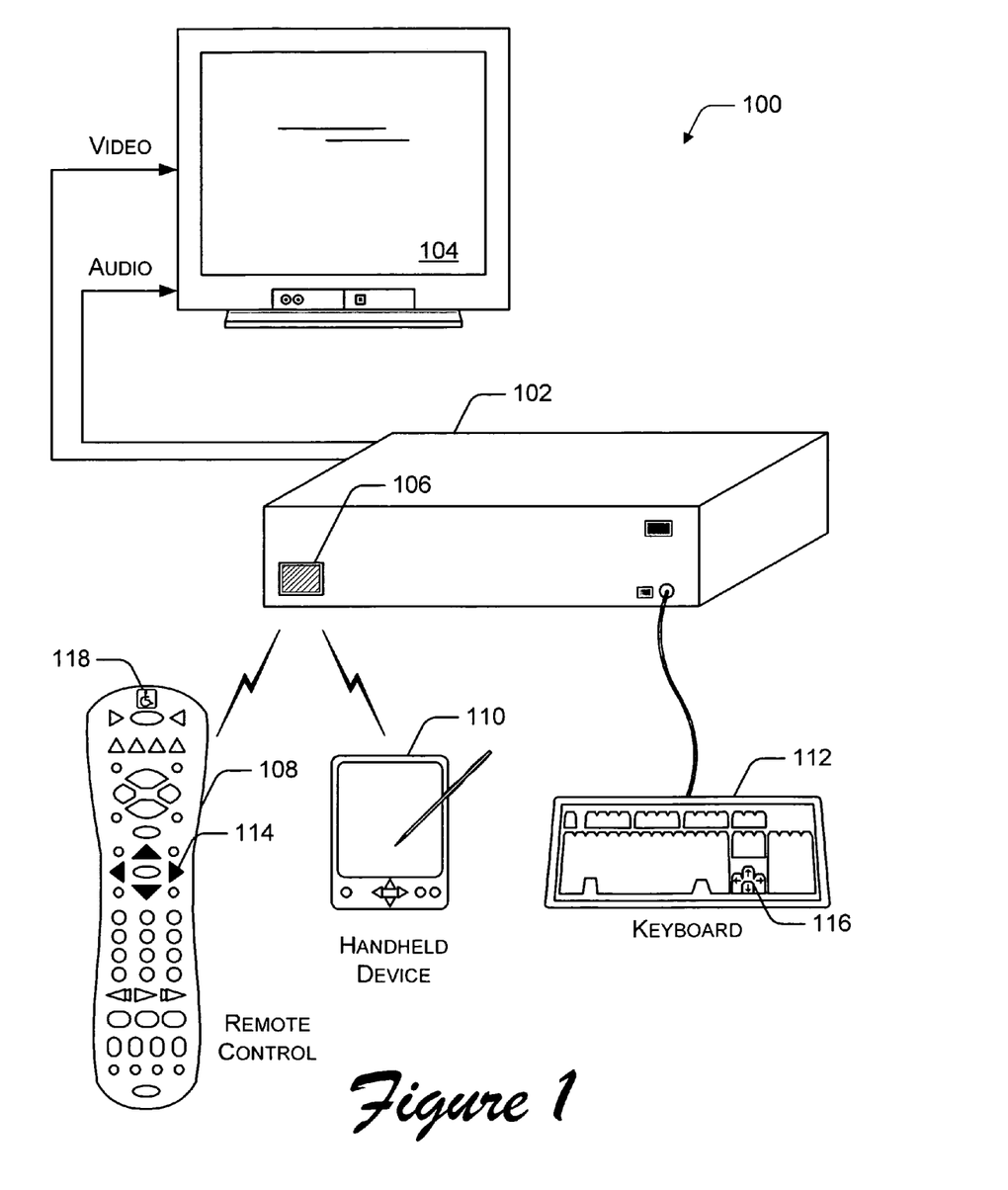

FIG. 1 illustrates an exemplary interactive television system 100, which includes client device 102, display device 104, and various input devices that interact with the client device. Client device 102 may be implemented in many forms, including as a television set-top box, a game console, a satellite receiver, a digital video recorder, a television, a personal computer system, a cellular telephone, and a personal multi-modal device.

Client device 102 includes a wireless receiving port 106 (e.g., an infrared (IR) wireless port) for receiving wireless communications from a remote control device 108, a handheld device 110 (such as a personal digital assistant (PDA) or handheld computer), or other wireless device, such as a wireless keyboard. Additionally, a wired keyboard 112 may be coupled to client device 102 for communicating with the client device. In alternate embodiments, remote control device 108, handheld device 110, and/or keyboard 112 may us an RF communication link (or other mode of transmission) to communicate with client device 102. In another alternate embodiment, client device 102, display device 104, and an input device may be implemented as a single hardware unit, such as a cellular telephone or as a handheld device similar to handheld device 110.

In the exemplary system described herein, HTML content navigation is performed by a user using directional inputs by pressing arrow buttons 114 of remote control 108, arrow keys or other inputs associated with handheld device 110, or arrow keys 116 of keyboard 112. Such keys might comprise four orthogonal direction keys (up, down, left, and right), or might allow movement in additional directions, as with one multi-directional key. For example, by pressing the arrow buttons, a viewer can move a colored indicator from one focusable element to another. The viewer can select an element, to cause the browser to perform some functionality associated with the selected element. For example, by pressing a "select" button on remote control 108 while a button associated with an HTML document has the focus, causes the browser to perform the functionality associated with the button.

Users can activate an accessibility mode using an input device, for example, by pressing an accessibility button 118 on remote control 108. Once in the accessibility mode, alternate content can be rendered by focusing on an element that has associated alternate content or alternatively, by selecting a focused element (e.g., when a viewer presses a "select" button on the remote control).

An element may also have multiple instances of associated alternate content. For example, an image element may have a first alternate content that consists of a textual description of the image, a second alternate content that consists of a more detailed textual description of the image, and a third alternate content that consists of an audio description of the image. In such an implementation, when a user selects an element that has associated alternate content, the first alternate content is rendered; pressing the select button a second time causes the second alternate content to be rendered; and so on. To support elements with multiple instances of alternate content, the television viewing system 100 may also include one or more mechanisms that allow a viewer to return to the standard element content (i.e., the content associated with an element that is displayed when the accessibility mode is not active). For example, while an accessibility mode is active, pressing a particular button on remote control 108 causes the standard image associated with an image element to be displayed instead of an associated textual description of the image that may be displayed as alternate content associated with the image element.

Client device 102 includes a rendering engine for generating a video signal and/or an audio signal, both of which are communicated to display device 104. The video signals and audio signals can be communicated from client device 102 to display device 104 via an RF (radio frequency) link, S-video link, composite video link, component video link, or other communication link. Although not shown in FIG. 1, a particular client device 102 may include one or more lights or other indicators identifying the current status of the client device. Additionally, a particular client device 102 may include one or more control buttons or switches (not shown) for controlling operation of the client device.

Exemplary Client Device

Figure 2:
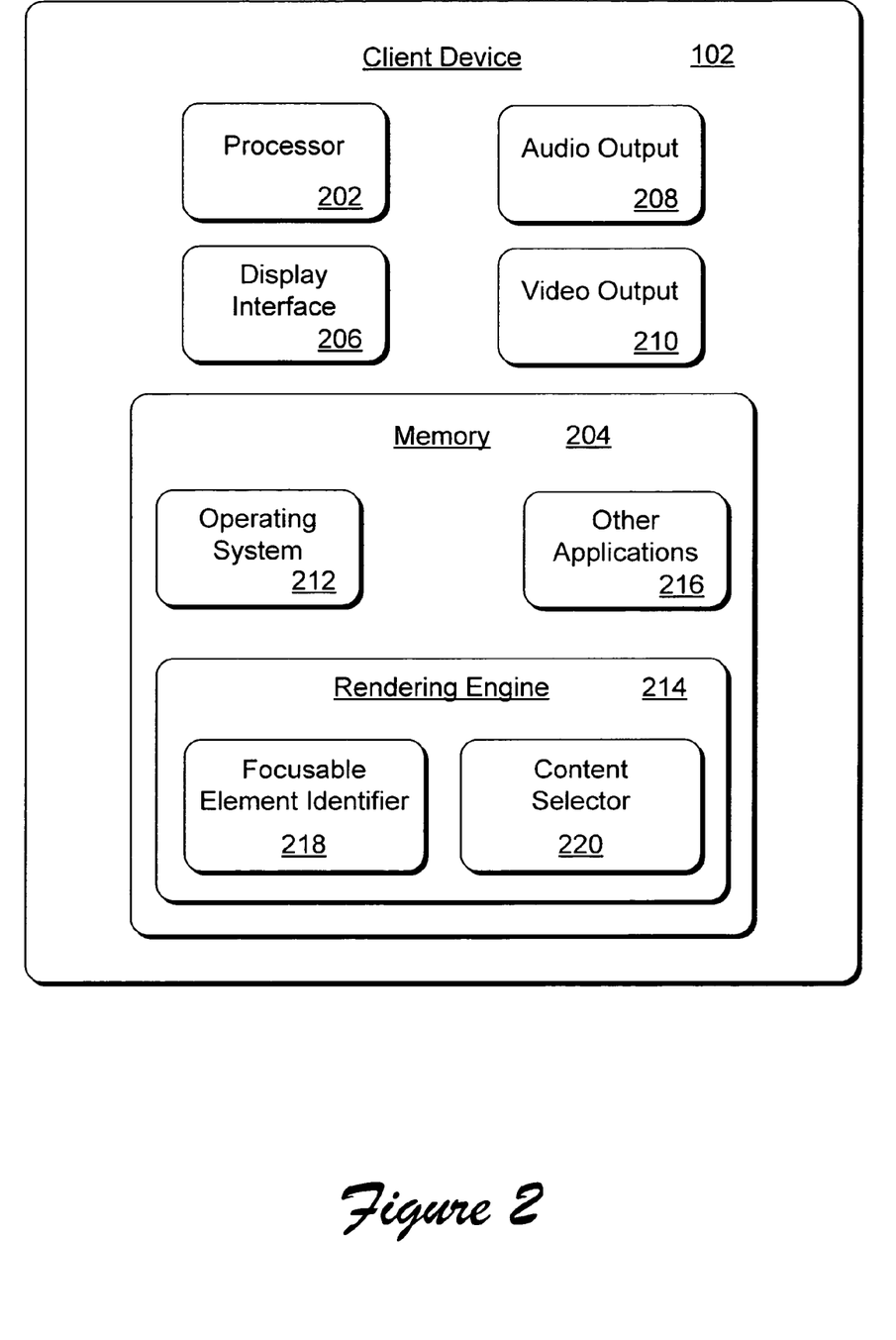

FIG. 2 is a block diagram illustrating select components of a client device 102 implemented to support access to alternate content as described herein. Client device 102 may be implemented as, but is not limited to, a television set-top box, a game console, a satellite receiver, a digital video recorder, a television, a personal computer system, a cellular telephone, or a personal multi-modal device.

Client device 102 includes a processor 202, a memory 204, a display interface 206, an audio output 208, and a video output 210. Operating system 212, rendering engine 214, and other applications 216 are stored in memory 204 and executed on processor 202. Display interface 206, audio output 208, and video output 210 provide mechanisms for client device 102 to communicate documents rendered by rendering engine 214 to display device 104.

To support alternate content accessibility as described herein, rendering engine 214 includes focusable element identifier 218 and content selector 220. Focusable element identifier 218 determines, based on whether or not an accessibility mode is active, which elements in a document to be rendered are focusable. When accessibility mode is active, some elements that, by default, are not focusable (e.g., an image element in an HTML document), but which have associated alternate content (e.g., a textual or audio description of an image), are added to a list of focusable elements.

HTML documents are written according to a standard HTML specification, such as the HTML4.01 specification, which defines the structure of HTML documents, including HTML elements and the various attributes that may be associated with each element. In the described implementation, rendering engine 214 is configured to render an HTML document according to a standard HTML specification. Accordingly, rendering engine 214 determines which elements are focusable when an accessibility mode is inactive based on a list of focusable elements derived from the HTML specification. Similarly, rendering engine 214 determines which elements are focusable when an accessibility mode is active based on attributes associated with each of the elements in a particular HTML document. For example, and image element that is not focusable when an accessibility mode is inactive may become focusable when the accessibility mode is activated if the image element has an associated "alt" attribute used to store a short textual description of the image or an associated "longdesc" attribute used to store a reference to a long textual description of the image. The "longdesc" attribute may also be used to store a reference to other media content, such as an audio file that may, for example, provide an audio description of the image with which it is associated.

Content selector 220 determines which content associated with a particular element is to be rendered based on whether or not an accessibility mode is active, and in the case where the accessibility mode is active, also based on how many times a particular element has been selected.

For example, when an accessibility mode is not active for an image element, which may have associated alternate content, the image itself is the content to be rendered. When the accessibility mode is activated and the image element has focus and/or is selected (depending on the implementation), the alternate content associated with the image is to be rendered. As described above, the alternate content associated with an element is identified according to a standard specification associated with the HTML document. Furthermore, an element may have multiple instances of associated alternate content. For example, an image may have as alternate content both a textual description of the image and an audio description of the image. The content selector 220 is also used to determine which of multiple alternate content to be rendered. For example, when the element has focus, the first time the element is selected, the first alternate content (e.g., a textual description of the image) is rendered; if the element is selected a subsequent time, then the second alternate content (e.g., an audio description of the image) is rendered. This provides document creators the ability to generate documents in which an element can have various levels of alternate content to facilitate a wide range of viewer accessibility needs, due to, for example, visual or audio impairments of varying degree. The order in which alternate content is rendered may be determined based on an attribute order specified in the HTML specification. Alternatively, rendering engine 214 may be configured to render content associated with alternate content attributes of an element according to an alphabetical ordering of the attributes or according to another pre-defined ordering of attributes.

Alternate content may also be used to direct a user to additional documents. For example, when a user selects an element, the associated alternate content may be, in and of itself, another document that is rendered in a separate browser window. In this case, the viewer may browse the alternate content, which may also include links to yet additional documents. To provide an easy way for a viewer to return to the originally rendered document, the accessibility button 118 (or other button on remote control 108) may be configured to cause the interactive television system to close any extraneous windows opened as a result of viewing alternate content, and return to the display of the original document.

Accessing Alternate Content

In the described implementation, alternate content such as HTML may be accessed when an accessibility mode is active. The default is for the accessibility mode to be inactive.

FIGS. 3-8 illustrate example renderings of the following example HTML document:

<!DOCTYPE HTML PUBLIC "-//W3C//DTD HTML 4.01 Transitional//EN" "http://www.w3.org/TR/1999/REC- -continued

```
html401-19991224/loose.dtd">
<html>
    <head>
        <title>Welcome to the Example.com home page</title>
    </head> <body><div align="center">
        <h1><img src="titletext.png" alt="Welcome to
Example.com"></h1>
        <h2>Caring for Injured Animals is Our Passion</h2>
        <form action="moreinfo.html">
            <input type="submit" value="Click Here to Learn
More">
            <img src="injuredpuppy.png" width="160"
height="240" align="middle"
                alt="Picture of Injured Puppy"
                longdesc= "puppydesc.way">
        </form>
    </div></body>
</html>
```

Figure 3:
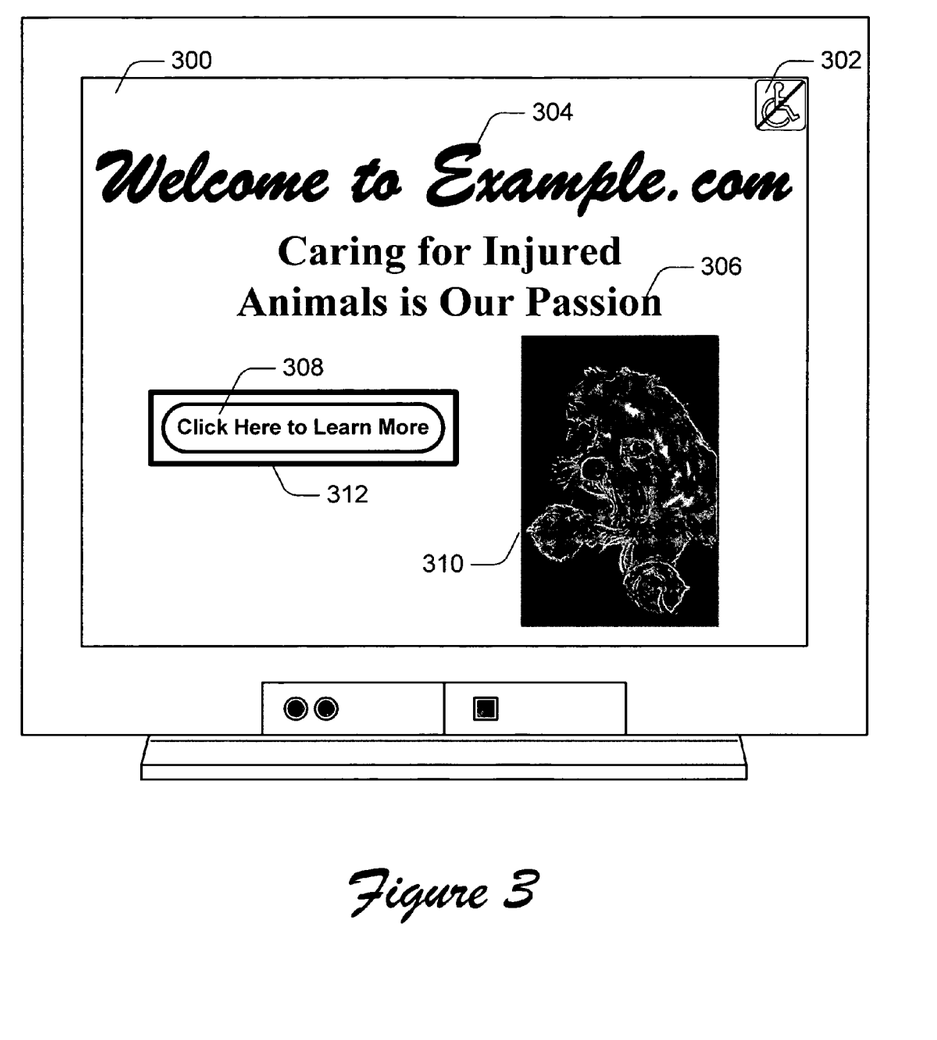

FIG. 3 illustrates a representative display of an HTML document 300 when the accessibility mode is inactive, as indicated by icon 302 or other demarcation. In an exemplary implementation, if an HTML document does not contain elements that have associated alternate content, a different icon or no icon at all may be displayed. In an alternate implementation, in addition to displaying icon 302, the document rendering system may also (or alternatively) produce an audio indicator when the document is first rendered to indicate that the accessibility mode is not active. HMTL document 300 has elements with associated alternate content, but the alternate content is not rendered because the accessibility mode is not active. The example HTML document 300 includes a title text element 304, a second text element 306, a button element 308, and an image element 310. A focus indicator 312 is displayed around button element 308 and indicates that button 308 currently has focus.

Figure 4:
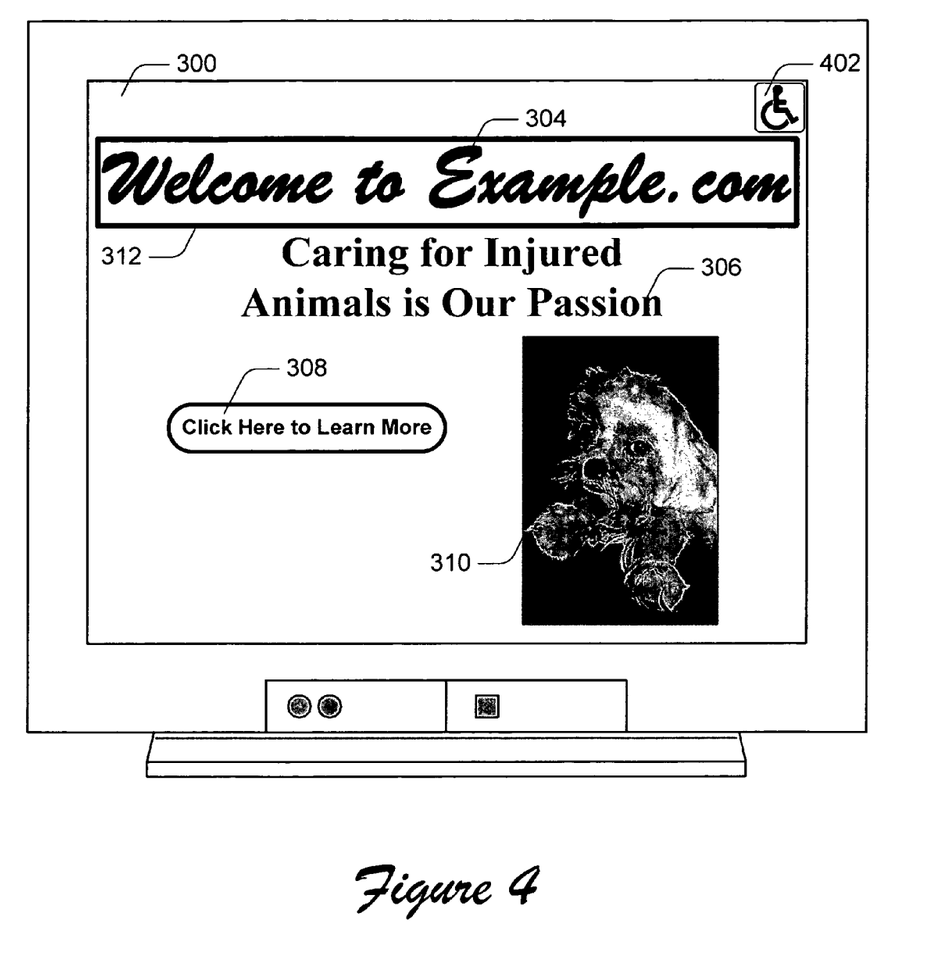

FIG. 4 illustrates the display of HTML document 300 once the accessibility mode has been activated. As noted above, the user can activate this mode by pressing a dedicated or logically assigned button on an input device. As an example, a viewer may have pressed an accessibility mode button 118 on remote control 108 to activate the accessibility mode. Icon 402 indicates that the document is being rendered in accessibility mode. In addition to, or instead of, icon 402, the document rendering system may also produce an audio indicator when the document is first rendered or when the accessibility mode is activated to indicate that the accessibility mode is active. When accessibility mode is activated, elements that are not, by default, focusable, but that have associated alternate content, are added to a list of focusable elements that is maintained by rendering engine 214 based on the specification associated with the document. In the illustrated example, title text element 304 and image element 310 are not focusable elements by default, but have associated alternate content, and are thus added to a list of focusable elements that includes button element 308. Focus indicator 312 indicates that the title text element 304 currently has focus. In an exemplary implementation, focus indicator 312 may appear differently if the selected element has alternate content. For example, the focus indicator may be rendered using a different color, such as blue rather than yellow, or using a different style, such as a dashed line rather than a solid line. If a viewer selects the text element that currently has focus (e.g., by pressing a "select" button on the remote control), the alternate content associated with the element is rendered.

Figure 5:
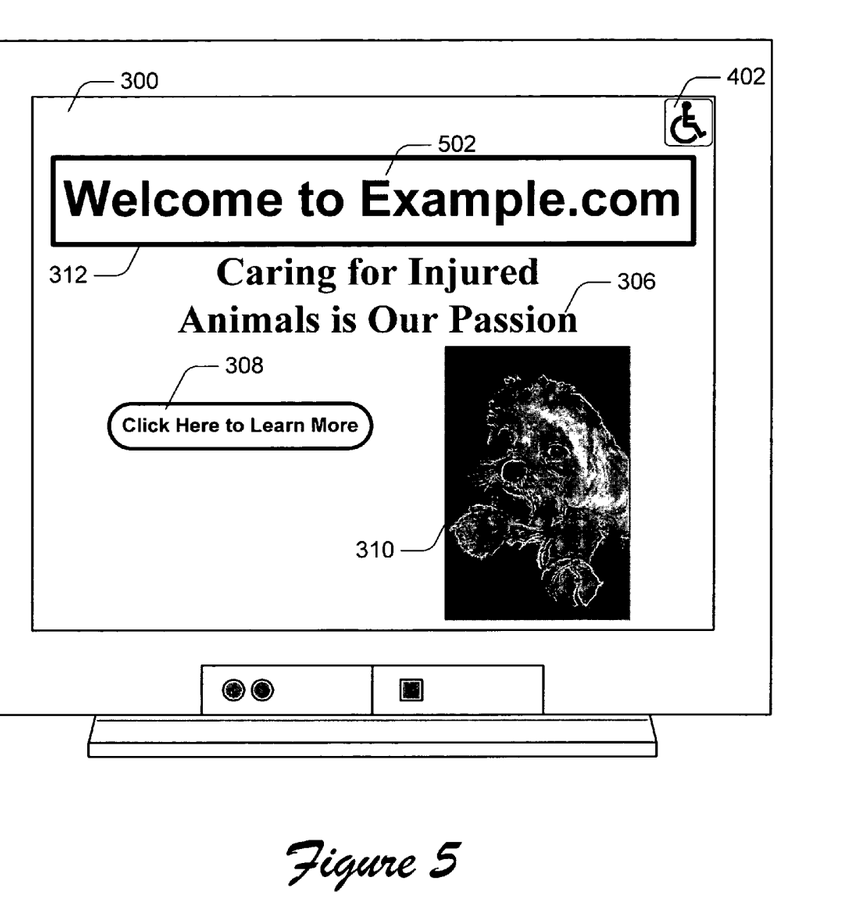

FIG. 5 illustrates document 300 after a user moves the focus to an element with alternate content. Here, the user selects title text element 304 (as described above). Upon selection, the original text (written in a script font) is replaced with associated alternate content 502. In this case, the standard content text that was rendered using a font that is difficult to read is replaced with the alternate content, which in this case, is the same text rendered using a font that is easier to read. In an alternate implementation, rather than replacing the standard element content with the associated alternate content, the browser may render the alternate content in a separate window.

Figure 6:
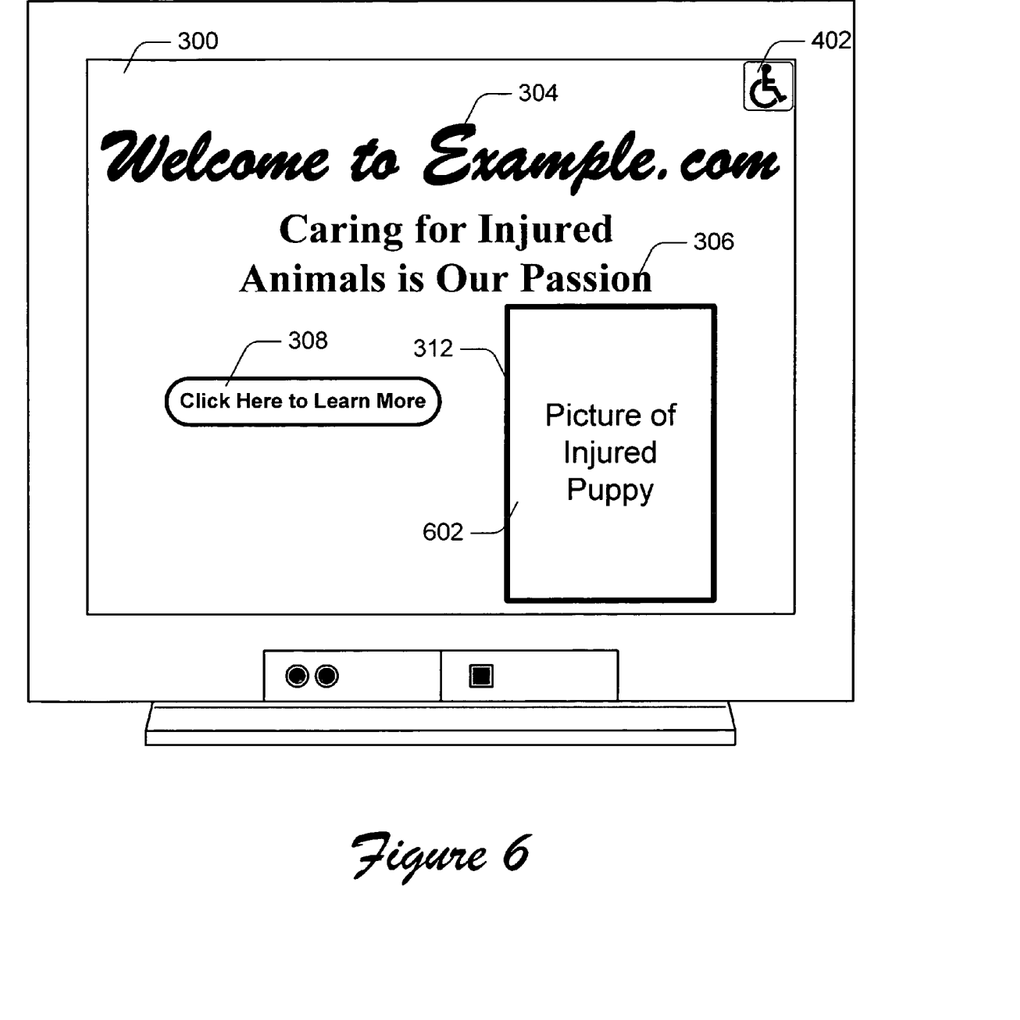

FIG. 6 illustrates document 300 after a user moves the focus to an element with alternate content. Here, the user selects image element 310 (as described above). Upon selection, causing alternate content 602 (a textual description of the image) associated with image element 310 to be rendered. If there is additional alternate content associated with image element 310, then selecting the element a second time causes the second alternate content to be rendered.

Figure 7:
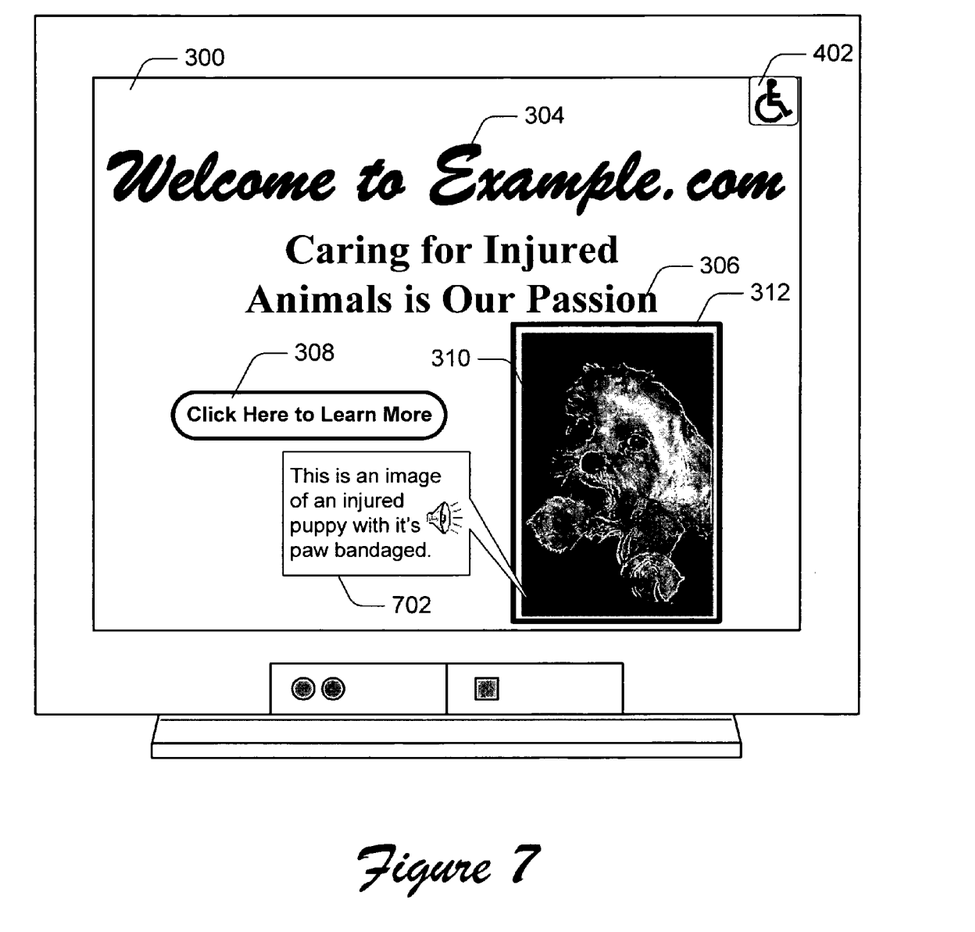

FIG. 7 illustrates the rendering of additional alternate content associated with image element 310. Focus indicator 312 indicates that the image element 310 currently has focus. In this example, the second alternate content associated with image element 310 consists of an audio description of the image, indicated in FIG. 7 by text bubble 702. When image element 310 is selected for the second time, the audio description is played, for example, through speakers associated with display device 104.

Method for Providing Access to Alternate Content

Access to alternate content may be described in the general context of computer-executable instructions, such as application modules, being executed by a computer. Generally, application modules include routines, programs, objects, components, data structures, etc. that perform particular tasks or implement particular abstract data types. Alternate content access may be implemented using any number of programming techniques and may be implemented in local computing environments or in distributed computing environments where tasks are performed by remote processing devices that are linked through various communications networks based on any number of communication protocols. In such a distributed computing environment, application modules may be located in both local and remote computer storage media including memory storage devices.

Figure 8:
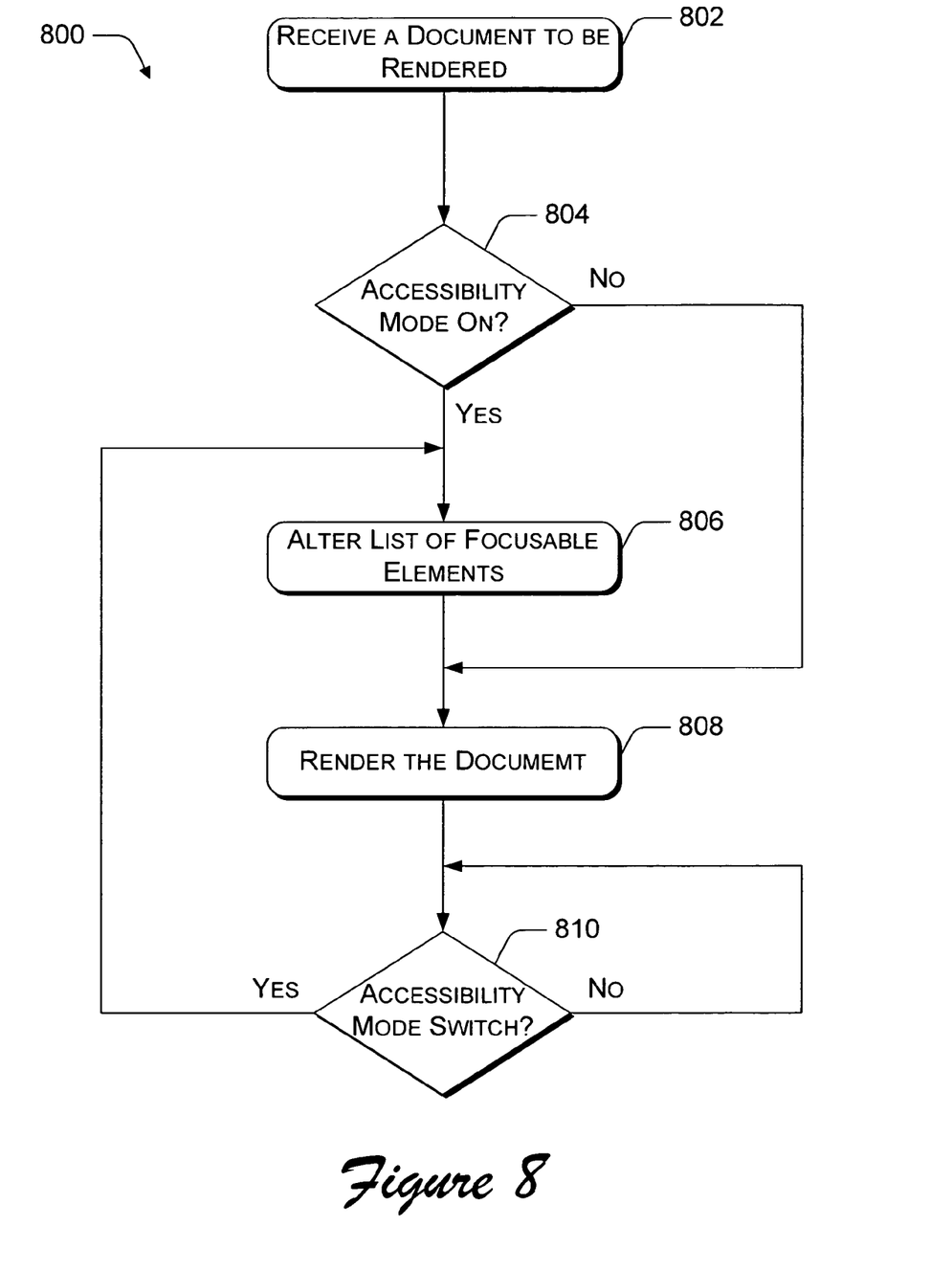

FIG. 8 illustrates a method 800 for providing access to alternate content associated with elements of a rendered document. For illustrative purposes, FIG. 8 will be described with reference to components illustrated in FIGS. 1 and 2.

At block 802, a browser (or other type of rendering application) receives a document to be rendered.

At block 804 the browser determines whether or not an accessibility mode is active, for example by examining an accessibility flag maintained by the browser. Activation of an accessibility mode may be supported by any number of implementations. For example, a user may press an accessibility button 118 on a television remote control 108 to toggle into and out of an accessibility mode.

If the browser determines that an accessibility mode is not active (the "No" branch from block 804), then method 800 continues at block 808, described below. On the other hand, if the browser determines that an accessibility mode is active (the "Yes" branch from block 804), then at block 806, the focusable element identifier 218 alters a list of focusable elements associated with the document by adding to the list any elements that have associated alternate content. By default the list of focusable elements includes all elements that can, by default, be given focus, such as buttons, text entry boxes, and so on. In accessibility mode, the list of focusable elements also includes elements that, by default, cannot receive focus (e.g., images, plain text, etc.), but that have associated alternate content. By including these elements in the list of focusable elements, a viewer is able to set the focus to and/or select the element and thereby access the associated alternate content. The browser examines the HTML document to identify elements that are focusable, based on the HTML specification. When the accessibility mode is active, an element may be added to the list of focusable elements if the element has an associated alternate content attribute, even if the HTML specification indicates that the element is not focusable.

At block 808, the browser renders the document.

At block 810, the browser monitors viewer input for an accessibility mode switch. As indicated by the "No" branch from block 810, the browser continues to monitor until an accessibility mode switch indicator is received. When the browser receives an indication of an accessibility mode switch, either from active to inaction or vice versa, method 800 continues at block 806 (the "Yes" branch from block 810), where the focusable element identifier 218 alters a list of focusable elements associated with the document. As described above, when a viewer switches into (i.e., activates) the accessibility mode, elements that are not focusable by default may be added to the list of focusable elements. When a viewer switches out of (i.e., deactivates) the accessibility mode, elements that are not focusable by default may be removed from the list of focusable elements.

Figure 9:
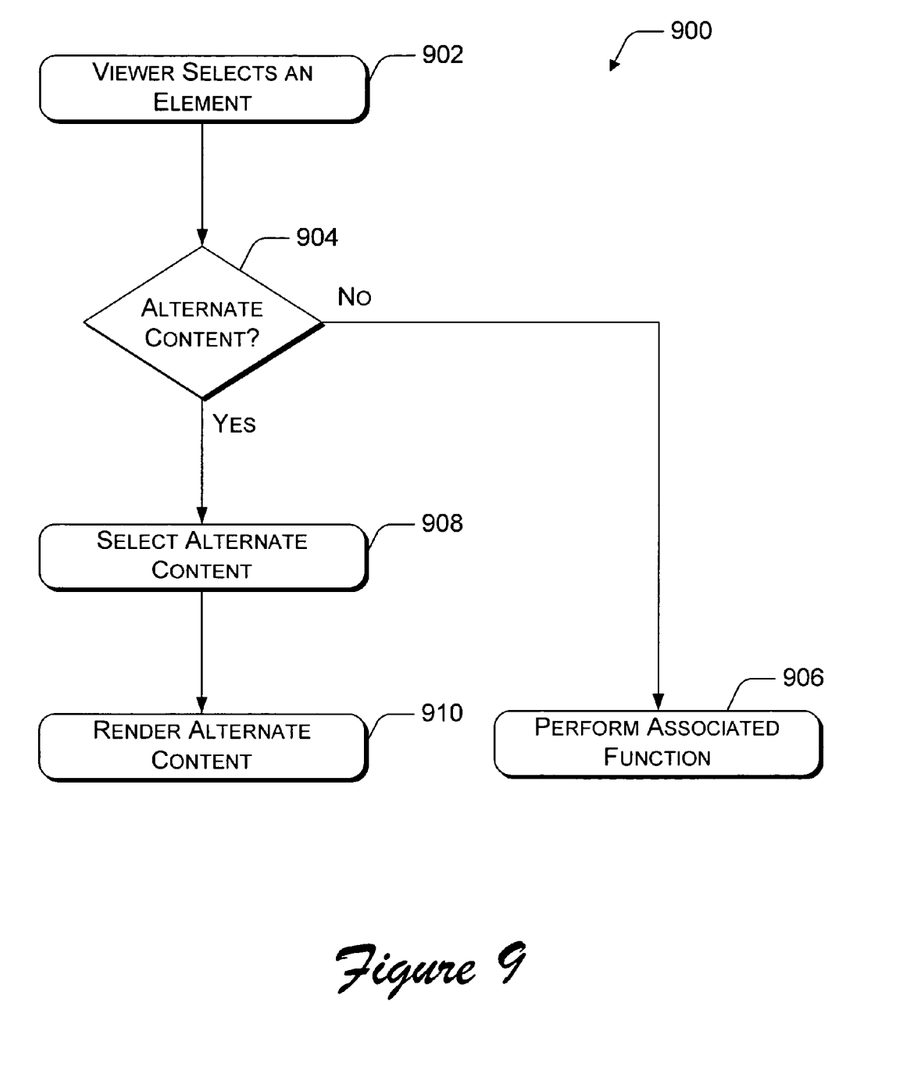

FIG. 9 illustrates an exemplary method for rendering alternate content when the system is in an accessibility mode.

At block 902, the rendering engine 214 receives an indication that a viewer has selected an element of a rendered document.

At block 904, the rendering engine 214 determines whether or not the selected element has associated alternate content by examining the attributes of the element. If the selected element does not have associated alternate content, then the element is, by default, focusable, and is therefore designed to provide some functionality when selected.

At block 906, when it is determined that the selected element does not have associated alternate content (the "No" branch from block 904), the rendering engine 214 performs the function that is associated with the element.

At block 908, when it is determined that the selected element does have associated alternate content (the "Yes" branch from block 904), the content selector 220 determines which content associated with the element to render. For example, if the element has only one instance of associated alternate content, then that alternate content is selected. However, if the element has multiple instances of associated alternate content, then the content selector determines which of the multiple instances of associated alternate content is most appropriate to be rendered. As described above, in one implementation, the selection is made based on the number of times the element has been subsequently selected; for example, the first time the element is selected, a first instance of associated alternate content is selected; the second time the element is selected, a second instance of associated alternate content is selected; and so on. In one implementation, the order in which the alternate content is displayed may be based on an attribute order specified in the HTML specification. Any number of other techniques may be used to select an appropriate instance of associated alternate content.

At block 910, the rendering engine 214 renders the selected alternate content. In one implementation, the entire document is re-rendered, with the alternate content in place of the previously rendered content associated with the selected element. Alternatively, only the affected area of the document is re-rendered. In another alternate implementation, the alternate content is rendered in a new browser window.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A method comprising:
    receiving an HTML document to be rendered, the document including:
        a standard mode, via which standard content may be rendered to a user;
        an accessibility mode, for enabling presentation of alternate formats of data to be rendered via the HTML document;
        a first element that has standard content that is rendered, by default, when the HTML document is rendered;
        a second element that has both standard content that is rendered, by default, when the HTML document is rendered, and alternate content, wherein the alternate content provides an alternate rendering of information represented by the standard content of the second element, and wherein the alternate content may be rendered when the accessibility mode of the HTML document is activated; and
        a focus indicator that indicates, at any given time, a single element of focus, that is the default recipient of user input from a non-pointer input device;
    determining, based on an element type associated with the first element, that the first element is by default selectable for focus, and is therefore, a focusable element;
    determining, based on an element type associated with the second element, that the second element is by default not selectable for focus, and is therefore, not a focusable element;
    generating a list of focusable elements associated with the document, such that the list includes the first element, but does not include the second element;
    rendering the document such that:
        the standard content associated with the first element is rendered;
        the standard content associated with the second element is rendered; and
        the focus indicator indicates that the first element is the current element of focus;
    receiving a user-submitted accessibility mode command to activate an accessibility mode of the document;
    in response to receiving the user-submitted accessibility command, altering the list of focusable elements to include the second element, thereby enabling the second element to be indicated by the focus indicator, wherein the list of focusable element is altered to include the second element based on a determination that the second element has alternate content;
    in response to a user-submitted directional command, moving the focus indicator to the second element;
    determining that the accessibility mode of the document is active; and in response to determining that the accessibility mode of the document is active, rendering the alternate content associated with the second element.

2. The method as recited in claim 1 wherein the second element comprises a text element.

3. The method as recited in claim 1 wherein the second element comprises an image element.

4. The method as recited in claim 1 wherein the second element comprises an audio element.

5. The method as recited in claim 1 wherein the second element comprises a multimedia element.

6. The method as recited in claim 1 wherein the alternate content comprises text.

7. The method as recited in claim 1 wherein the alternate content comprises image data.

8. The method as recited in claim 1 wherein the alternate content comprises audio data.

9. The method as recited in claim 1 wherein the alternate content comprises multimedia data.

10. The method as recited in claim 1 wherein the alternate content comprises a second document that can be rendered.

11. The method as recited in claim 1, wherein in response to determining that the accessibility mode of the document is active, rendering the alternate content associated with the second element further comprises:
   subsequent to moving the focus indicator to the second element, receiving a user-submitted selection command; and
   in response to receiving the user-submitted selection command, rendering the alternate content associated with the second element.

12. The method as recited in claim 1, wherein rendering the alternate content comprises replacing the standard content that was rendered with a rendering of the alternate content.

13. The method as recited in claim 1, wherein rendering the alternate content comprises rendering the alternate content in a new browser interface window.

14. The method as recited in claim 1 further comprising rendering a visual demarcation to indicate a current state of the accessibility mode.

15. The method as recited in claim 14 wherein the visual demarcation is an icon.

16. The method as recited in claim 1 further comprising rendering an audio demarcation to indicate a current state of the accessibility mode.

17. A computer-readable storage medium comprising a browser application configured to perform the method as recited in claim 1.

18. A computer-readable storage medium comprising a rendering engine configured to perform the method as recited in claim 1.

19. An interactive television viewing system configured to perform the method as recited in claim 1.

20. One or more computer-readable storage media comprising computer executable instructions that, when executed, direct a computing system to perform the method as recited in claim 1.

21. One or more computer-readable storage media comprising computer executable instructions that, when executed, direct a computing system to execute a method, the method comprising:
   determining a list of focusable elements that includes those elements that are, by default, selectable for focus, the elements being associated with a document to be rendered;
   determining that the document is to be rendered in an accessibility mode;
   altering the list of focusable elements to further include elements that have associated alternate content but that are not, by default, selectable for focus;
   visually rendering the document such that standard content associated with each element is rendered and each element on the list of focusable elements can be selected;
   receiving an indication that an element has been selected as the current element of focus; and
   in an event that the selected element has associated alternate content, rendering the alternate content.

22. The one or more computer-readable media as recited in claim 21, wherein the method further comprises:
   visually indicating which element associated with the document currently has focus; and
   visually indicating whether or not the element that currently has focus has associated alternate content that may be rendered.

23. The one or more computer-readable media as recited in claim 22, wherein visually indicating which element associated with the document currently has focus comprises displaying a focus indicator encircling the element.

24. The one or more computer-readable media as recited in claim 22, wherein visually indicating whether or not the element that currently has focus has associated alternate content that may be rendered comprises:
   displaying a focus indicator of a first color encircling the element if the element does not have associated alternate content that may be rendered; and
   displaying a focus indicator of a second color encircling the element if the element does have associated alternate content that may be rendered.

25. The one or more computer-readable media as recited in claim 22, wherein visually indicating whether or not the element that currently has focus has associated alternate content that may he rendered comprises:
   displaying a focus indicator of a first style encircling the element if the element does not have associated alternate content that may be rendered; and
   displaying a focus indicator of a second style encircling the element if the element does have associated alternate content that may be rendered.

26. The one or more computer-readable media as recited in claim 21, wherein the method further comprises:
   receiving an indication that the element has been selected a second time; and
   in an event tat the element has a second associated alternate content, rendering the second alternate content.

27. The one or more computer-readable media as recited in claim 21, wherein the method further comprises:
   receiving an indication that the element has been de-selected; and
   rendering a standard content associated with the element.

* * * * *